United States Patent
Wohlgemuth et al.

(10) Patent No.: US 10,534,421 B2
(45) Date of Patent: Jan. 14, 2020

(54) VIRTUAL PER-PROCESSOR TIMERS FOR MULTIPROCESSOR SYSTEMS

(71) Applicant: Microsoft Corporation, Redmond, WA (US)

(72) Inventors: Jason Wohlgemuth, Duvall, WA (US); Cody Hartwig, Sammamish, WA (US); Bruce Sherwin, Jr., Old Saybrook, CT (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 146 days.

(21) Appl. No.: 13/916,621

(22) Filed: Jun. 13, 2013

(65) Prior Publication Data

US 2014/0372786 A1   Dec. 18, 2014

(51) Int. Cl.
| | |
|---|---|
| G06F 1/3234 | (2019.01) |
| G06F 9/48 | (2006.01) |
| G06F 9/50 | (2006.01) |
| G06F 9/4401 | (2018.01) |

(52) U.S. Cl.
CPC .......... G06F 1/3243 (2013.01); *Y02D 10/152* (2018.01)

(58) Field of Classification Search
CPC .... G06F 9/45533; G06F 9/5077; G06F 13/24; G06F 9/4812; G06F 15/17; G06F 15/17337
See application file for complete search history.

(56) References Cited

U.S. PATENT DOCUMENTS

| | | | | |
|---|---|---|---|---|
| 5,659,720 A | * | 8/1997 | Fiacco et al. | 713/502 |
| 6,205,509 B1 | * | 3/2001 | Platko et al. | 710/269 |
| 7,383,460 B2 | | 6/2008 | Sherwin, Jr. et al. | |
| 7,434,003 B2 | | 10/2008 | Oney et al. | |
| 8,145,884 B2 | | 3/2012 | Kissell | |
| 8,327,390 B2 | | 12/2012 | Erlingsson et al. | |
| 2003/0105798 A1 | * | 6/2003 | Kim | G06F 9/4812 718/105 |
| 2006/0031588 A1 | * | 2/2006 | Sen et al. | 709/248 |

(Continued)

FOREIGN PATENT DOCUMENTS

| | | |
|---|---|---|
| CN | 101216786 A | 7/2008 |
| CN | 101299193 A | 11/2008 |

(Continued)

OTHER PUBLICATIONS

"International Search Report & Written Opinion for PCT Application No. PCT/US2013/060242", dated Feb. 25, 2014, Filed Date: Sep. 18, 2013, 10 Pages.

(Continued)

*Primary Examiner* — Charles E Anya (57) ABSTRACT

A system provides virtual per-processor timers based on a timer such as a platform timer. To virtualize a timer to be used by each processor independently, a data structure is maintained in memory for the timer. The data structure has an entry for each interrupt to be produced for each processor using the timer, specifying the processor and the due time, with the entries sorted by due time. If the virtualized timer is a platform timer that maintains context during power transitions, a processor can switch to the virtual per-processor timer upon a context-losing power transition.

21 Claims, 7 Drawing Sheets

(56) References Cited

U.S. PATENT DOCUMENTS

| | | | |
|---|---|---|---|
| 2008/0162976 A1* | 7/2008 | Bennett et al. | 713/502 |
| 2008/0172666 A1* | 7/2008 | Inoue | 718/1 |
| 2009/0259870 A1* | 10/2009 | Sharma | G06F 9/45533 713/400 |
| 2011/0016295 A1* | 1/2011 | Catherwood et al. | 712/244 |
| 2011/0225591 A1* | 9/2011 | Wada | G06F 9/45533 718/103 |
| 2012/0144172 A1 | 6/2012 | De Cesare et al. | |
| 2012/0278800 A1 | 11/2012 | Nicholas et al. | |
| 2012/0284443 A1* | 11/2012 | Takeuchi | G06F 9/4812 710/260 |
| 2014/0201411 A1* | 7/2014 | Kumar | G06F 13/24 710/262 |
| 2014/0208330 A1* | 7/2014 | Pusukuri | G06F 9/4881 718/104 |

FOREIGN PATENT DOCUMENTS

| | | |
|---|---|---|
| CN | 102541630 A | 7/2012 |
| JP | 2012113558 A | 6/2012 |

OTHER PUBLICATIONS

Siddha, et al., "Getting Maximum Mileage Out of Tickless", In Linux Symposium, vol. 2, Jun. 2007, pp. 201-207.

Russinovich, et al., "Windows Internals Part 1", 6th Edition, Published on: Mar. 21, 2012, Available at: http://rogunix.com/docs/Reversing&Exploiting/WindowsInternals_6thED_part2.pdf.

Wei, et al., "The On-going Evolutions of Power Management in Xen", Published on: Dec. 31, 2009, Available at: http://www-archive.xenproject.org/files/xensummit_oracle09/xensummit_intel.pdf.

"IA-PC HPET (High Precision Event Timers) Specification", Published on: Oct. 2004, Available at: http://www.intel.com/content/dam/www/public/us/en/documents/technical-specifications/software-developers-hpet-spec-1-0a.pdf.

Jimenez, et al., "Power and Thermal Characterization of POWER6System", Retrieved at <<http://canturkisci.com/ETC/papers/PACT2010/pact296d-jimenez.pdf>>, In the Proceedings of the 19th international conference on Parallel architectures and compilation techniques, Sep. 11, 2010, pp. 13.

Stoess, Jan., "Towards Effective User-Controlled Scheduling for Microkernel-Based Systems", Retrieved at <<http://citeseerx.ist.psu.edu/viewdoc/download?doi=10.1.1.157.9980&rep=rep1&type=pdf>>, In the Journal of SIGOPS Operating Systems Review vol. 41, Issue 4, Jul. 2007, pp. 10.

Whitaker, et al., "Rethinking the Design of Virtual Machine Monitors", Retrieved at <<http://homes.cs.washington.edu/~gribble/papers/IEEE_vmm.pdf>>, In the Journal of Computer vol. 38, Issue 5, May 2005, pp. 6.

"Office Action Issued in European Patent Application No. 13779651.2", dated Sep. 15, 2016, 6 Pages.

"First Office Action and Search Report Issued in Chinese Patent Application No. 201380077384.0", dated Sep. 30, 2017, 17 Pages.

"Second Office Action Issued in Chinese Patent Application No. 201380077384.0", dated May 3, 2018, 8 Pages.

* cited by examiner

TIMER LIST 300

LOCK 316

LIST HEAD 314

PROCESSOR ENTRY 302
-DUE TIME 304
-PROCESSOR 306
-VALID/INVALID FLAG 308
-FORWARD POINTER 310
-BACKWARD POINTER 312

PROCESSOR ENTRY 302
-DUE TIME 304
-PROCESSOR 306
-VALID/INVALID FLAG 308
-FORWARD POINTER 310
-BACKWARD POINTER 312

VIRTUAL PER-PROCESSOR TIMERS FOR MULTIPROCESSOR SYSTEMS

BACKGROUND

In a computer system, a processor generally uses one or more timers to manage the forward progress of the work performed by the processor. The processor sets a timer so that the timer generates an interrupt at a desired point in time in the future.

In multiprocessor computer systems, including processing devices with multiple cores, there are generally two types of timers: per-processor timers and platform timers. A platform timer represents an instance of a timer that is shared among processors and can be accessed from any processor. A per-processor timer is an instance of a timer that is manipulated primarily by its respective processor.

From a power management point of view there also are two types of timers: timers that can be powered down and timers that are always on. A timer that can be powered down generally loses context when there is a power transition. A timer that is always on maintains context through power transitions.

When a processor is powered down, such as when the processor is entering a context-losing idle state, a per-processor timer that is not always-on will be stopped. In order for the processor to continue to monitor system status in the idle state, so as to identify a condition that results in becoming active again, a platform, always-on timer is used by that processor to maintain context. However, a platform timer generally can be controlled by only one processor at a time. Thus, in a multiprocessor system, when all processors have entered context-losing idle states, one processor programs the always-on platform timer to identify any condition that results in one or more processors becoming active again.

SUMMARY

This Summary introduces selected concepts in simplified form that are further described below in the Detailed Description. This Summary is intended neither to identify key or essential features of the claimed subject matter, nor to limit the scope of the claimed subject matter.

A system provides virtual per-processor timers by virtualizing a platform timer. To virtualize a platform timer to be used by each processor independently, a data structure is maintained in memory. The data structure has an entry for each processor using the platform timer, specifying the processor and the due time, with the entries sorted by due time. In one implementation, each processor has a single entry in the data structure. This entry can be marked as valid or invalid, depending on the state of the processor and whether the processor is using the virtual per-processor timer. When a processor adds an entry to the data structure that virtualizes the platform timer, in this implementation, any previous entry is cancelled and the new entry is placed in the data structure in order based on due time. The data structure can be protected from concurrent access by multiple processors, such as by using a lock.

The platform timer can be an always on timer, and can thus be used to maintain context for one or more processors through a power transition. A processor using any other per-processor timer may switch to the virtual per-processor timer (derived by virtualizing the platform timer) at a power transition. When a processor has a power transition, any other per-processor timer that is not always-on is powered down and the processor begins using the virtual per-processor timer, enabling each processor to have power transitions independently of other processors.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 4 is a flow chart of an example implementation of transitioning to a virtual per-processor timer when a processor is losing state and currently using a per-processor timer that is not always-on.

DETAILED DESCRIPTION

The following section provides an example operating environment in which virtual per-processor timers can be implemented.

Figure 1:
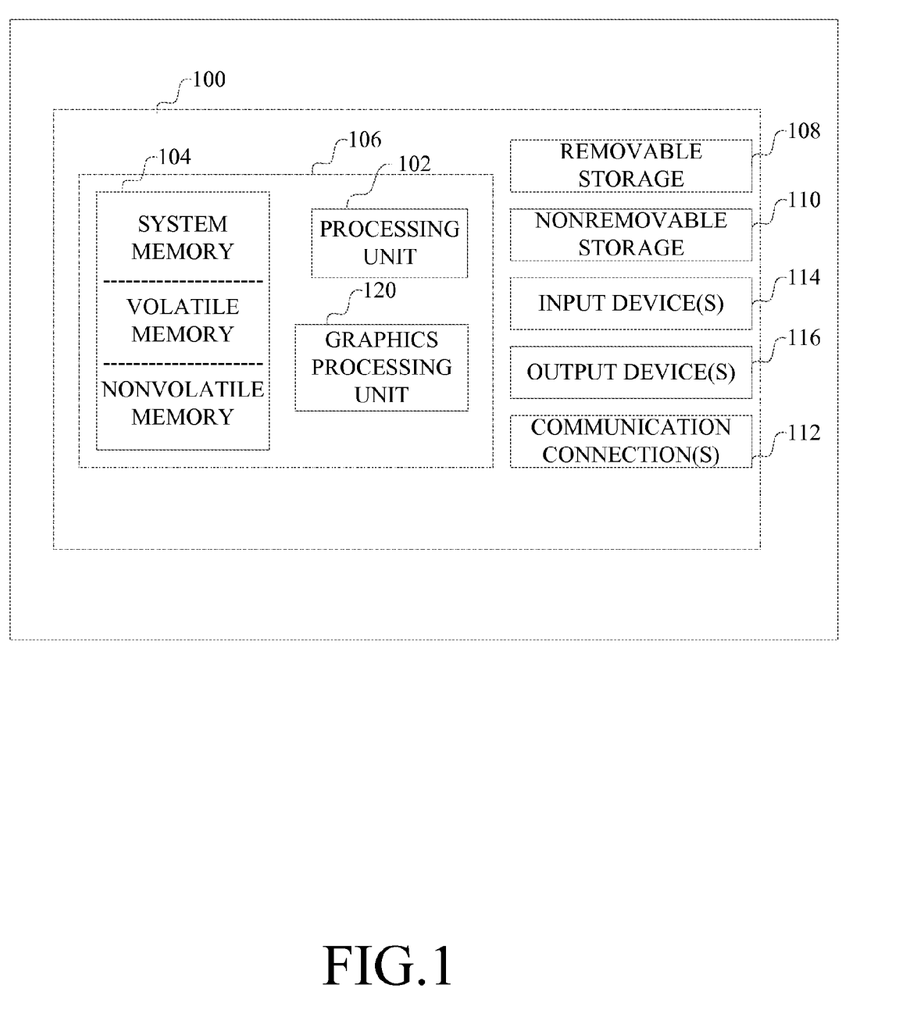
FIG. 1 is a block diagram of an example computer with which a system with virtual per-processor timers can be implemented.

Referring to FIG. 1, the following description is intended to provide a brief, general description of a general purpose computer that may use such virtual timers. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders, tablets), multiprocessor systems, microprocessor-based systems, set top boxes, game consoles, programmable consumer electronics, network PCs, minicomputers, mainframe computers, distributed computing environments that include any of the above systems or devices, and the like.

FIG. 1 illustrates an example of a suitable computer. This is only one example of a suitable computer and is not intended to suggest any limitation as to the scope of use or functionality of such a computer.

With reference to FIG. 1, an example computer 100, in a basic configuration, includes at least one processing unit 102 and memory 104. The computer may include multiple processing units and/or additional co-processing units such as graphics processing unit 120. Depending on the exact configuration and type of computer, memory 104 may be volatile (such as RAM), non-volatile (such as ROM, flash memory, etc.) or some combination of the two. This configuration is illustrated in FIG. 1 by dashed line 106.

Additionally, computer 100 may also have additional features/functionality. For example, computer 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 100. Any such computer storage media may be part of computer 100.

Computer 100 may also contain communications connection(s) 112 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 112 are devices that interface with the communication media to transmit data over and receive data from communication media, such as a network interface.

Computer 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Given a computer such as described above, the use of virtual per-processor timers assumes that the computer includes multiple processors, whether multiple distinct processing devices or multiple cores and the like, and their timers. The use of the term "processor" herein is intended to include any logical processor, including but not limited to a single instance of a hardware processor, one of multiple processors, a "core" in a multiple core processor or any other processing unit that can be managed independently of other processing units.

The virtual per-processor timers described herein generally are managed by the operating system, firmware or other low level software on the computer. In one implementation, the operating system includes a kernel that manages access to specific hardware resources through a hardware abstraction layer. The virtual timers described below can be implemented in such a hardware abstraction layer. They can also be implemented in a hardware abstraction layer extension module. Alternatively, other components of an operating system, firmware of a computer and the like can implement such functionality. The computer program that manages the virtual per-processor timers can be associated with a subset of all of the processors available on the computer.

Figure 2:
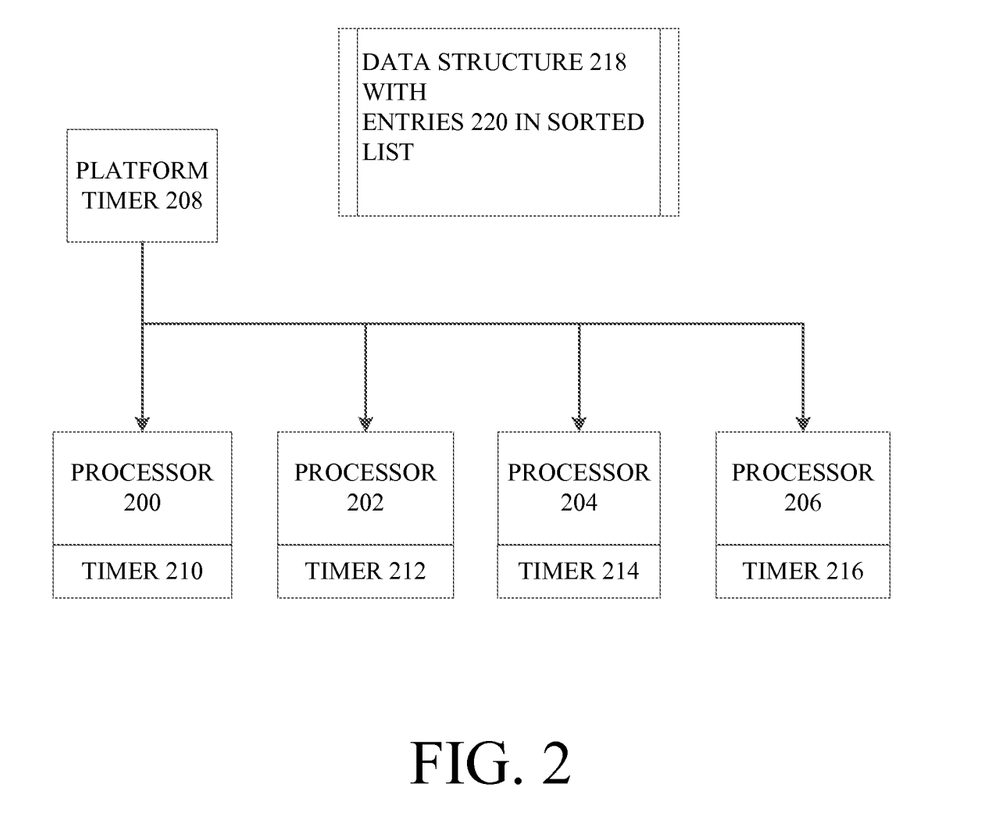
FIG. 2 is a block diagram of an example implementation of a system using virtual per-processor timers.

Referring now to FIG. 2, an example implementation of such a system will now be described in the context of an illustrative example. In FIG. 2, there are four processors 200, 202, 204 and 206, and each can have a respective per-processor timer 210, 212, 214 and 216. Each timer has a state (e.g., on/off) which can depend, for example, on the power state of its respective processor. If the timer is on, it also can be programmed to generate an interrupt at a specified due time.

A platform timer 208 also is provided. This platform timer can be an always-on timer, i.e., a timer that maintains context in the event of power transitions. This platform timer is virtualized using a data structure 218 which is maintained in memory. The data structure has an entry 220 for each processor using the platform timer. Each entry 220 specifies the processor and the due time. The entries can be stored in a form of linked list that is sorted in the list by due time. An example implementation of such a data structure is described in more detail below. Other structures, such as a sorted array or other data structure that can be readily sorted can be used.

At a designated due time for an entry for a processor, the platform timer generates an interrupt to the processor associated with that entry, and not the other processors. Given the sorted list of entries, the platform timer is successively armed for the nearest valid due time corresponding to each entry and generates an interrupt to the specified processor when each successive valid due time is reached. Each interrupt can be routed to its processor via an interrupt controller, or can be targeted to the processor using a message-based interrupt or can be directed to the processor using other known interrupt routing techniques.

Figure 3:
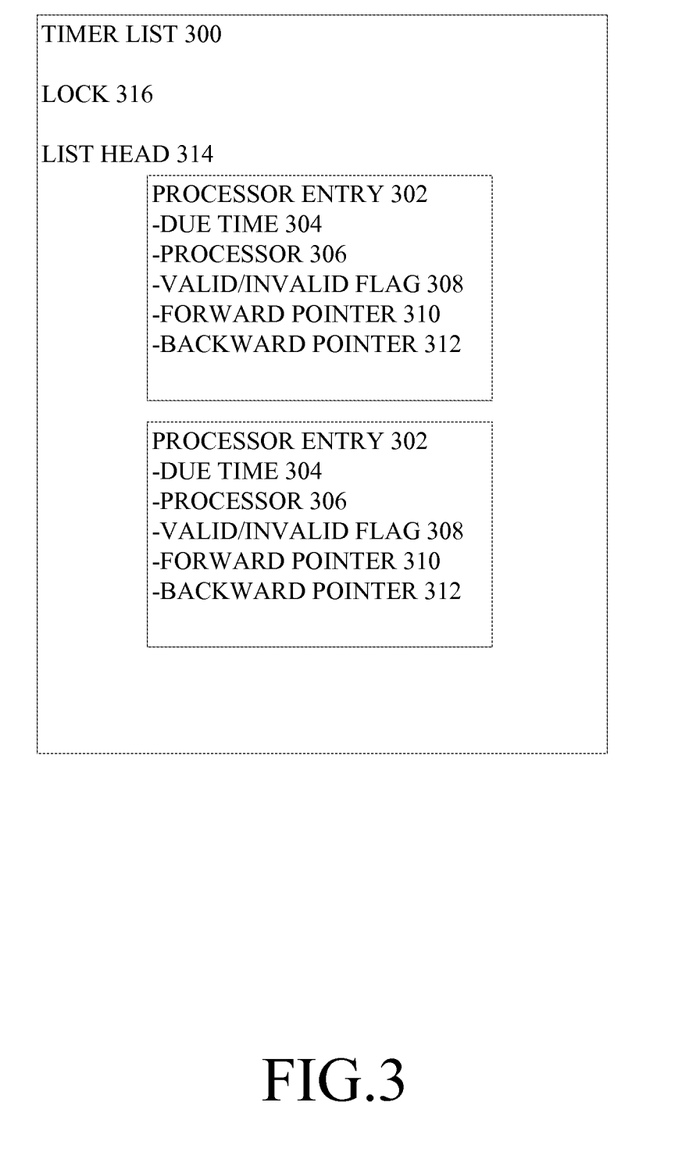
FIG. 3 illustrates an example implementation of a data structure used in virtualizing a platform timer.

An example implementation of the data structure for virtualizing the platform timer is shown in FIG. 3 and is called, herein a timer list 300. In this implementation, each processor using this virtualized platform timer has a single entry 302 representing its virtual per-processor timer. In FIG. 3, two such entries are shown, indicating two processors are using the virtualized platform timer. The entry indicates a due time 304 and the associated processor 306. This entry can be marked as valid or invalid, as indicated at 308, depending on the state of the processor and whether the processor is using the virtual per-processor timer. The timer list 300 is a sorted list of these entries 302.

Such a sorted list can be implemented, for example, as a linked list, where each entry 302 also stores a forward pointer 310 and a backward pointer 312 to the previous and next entries in the list. Such pointers are invalid, e.g., null, when the entry is invalid. A list head object 314 identifies the entry at the front of the list with a forward pointer, and the end of the list with its backward pointer; the entry at the front of the list has a backward pointer that points to the list head object. If there is only one entry in the list, both the forward and backward pointers of the list head object point to the one entry. When a processor adds an entry, in this implementation, any previous entry is removed from the sorted list. Any new entry is placed in the list in order based on due time, by setting the forward, backward and list head pointers accordingly. Any other data structure, such as an array, that is suitable for a short sorted list, can be used instead of a linked list.

The timer list 300 can be protected from concurrent access by multiple processors, such as by using a lock 316 or similar programming technique. Lock 316 as part of the data structure is only one possible implementation of such a lock.

Using the example implementation shown in FIGS. 2 and 3, the following processes can be performed during operation of a processor to transition between using a virtual per-processor timer and using any other per-processor timer.

Figure 4:
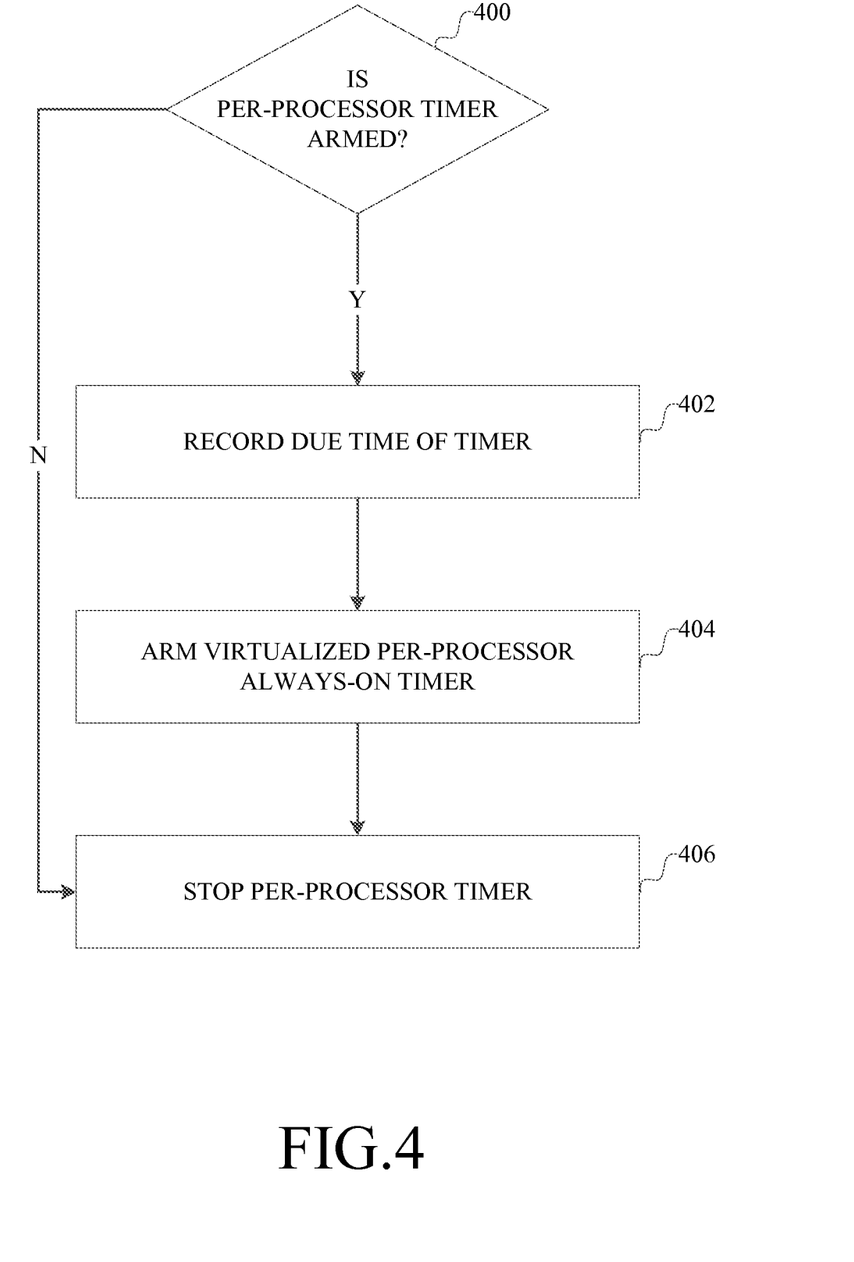

First, when a processor is using one or more per-processor timers, and the processor is losing state (such as by transitioning to a context-losing idle state), the following steps are performed for each per-processor timer before transitioning to using the virtual per-processor timer. If the timer is armed (i.e., set with a due time to generate an interrupt) as determined at 400, then the virtual per-processor timer is armed for the same due time. In particular, the due time of the timer is recorded 402 in the data structure for the virtual per-processor timer and marked valid. The virtual per-processor timer can then be armed 404 for that due time. The other per-processor timer is then stopped 406. If the other per-processor timer does not meet the criteria of step 400, i.e., it is not armed, it also can be stopped 406 as no due time is transferred to the virtual per-processor timer.

In practice, there is likely only one per-processor timer, i.e., the current system timer, which meets the criteria to be transferred to the virtual per-processor timer. Support for multiple timers per processor in the data structure 300 can be provided by adding data associating each per-processor timer on each processor with its corresponding due time, such as in the entry 302 for the processor.

If a processor transitions to a state in which it is using its own per-processor timer after using the virtual per-processor timer, there are a variety of possible implementations. For example, the outstanding due time on the virtual per-processor timer can be cancelled. As another example, the processor can wait for its due time on the virtual per-processor timer to expire and then transition to using the other per-processor timer.

Figure 5:
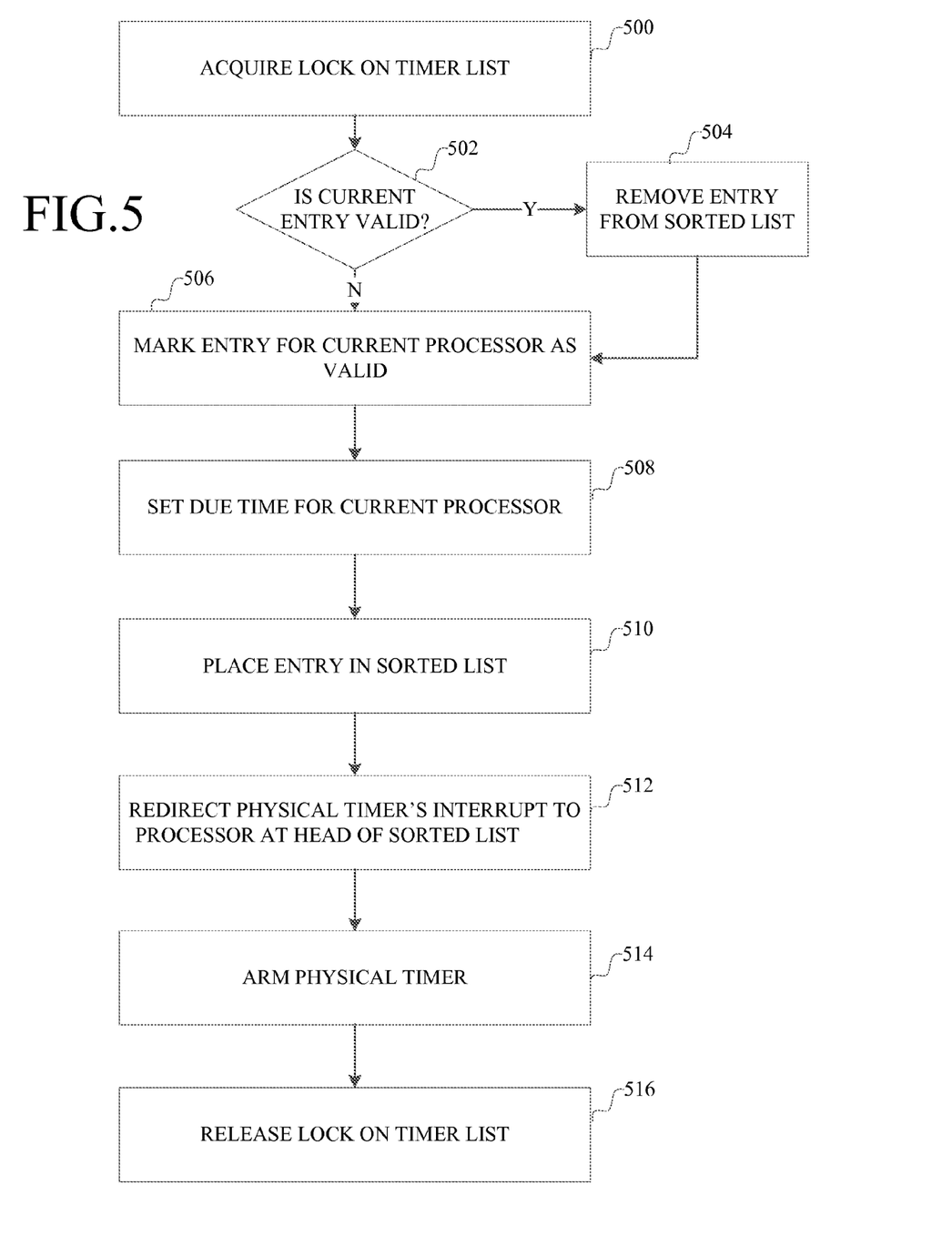
FIG. 5 is a flow chart of an example implementation of arming a timer.

FIG. 5 describes the process of arming the virtual per-processor timer for a processor. The processor acquires 500 a lock on the timer list. If the current entry for the processor is valid, as determined at 502, then the current entry for the processor is removed 504 from the timer's sorted list. The entry for the current processor is marked valid 506. The due time in this entry is set 508 to the recorded due time. The entry for the current processor is then placed 510 in the sorted list of entries, in order by its due time. The physical timer is then redirected 512 to point its interrupt to the processor with the entry at the head of the timer list. The physical timer is armed 514 to the due time indicated by the entry at the head of the timer list. The lock on the timer list is then released 516.

Figure 6:
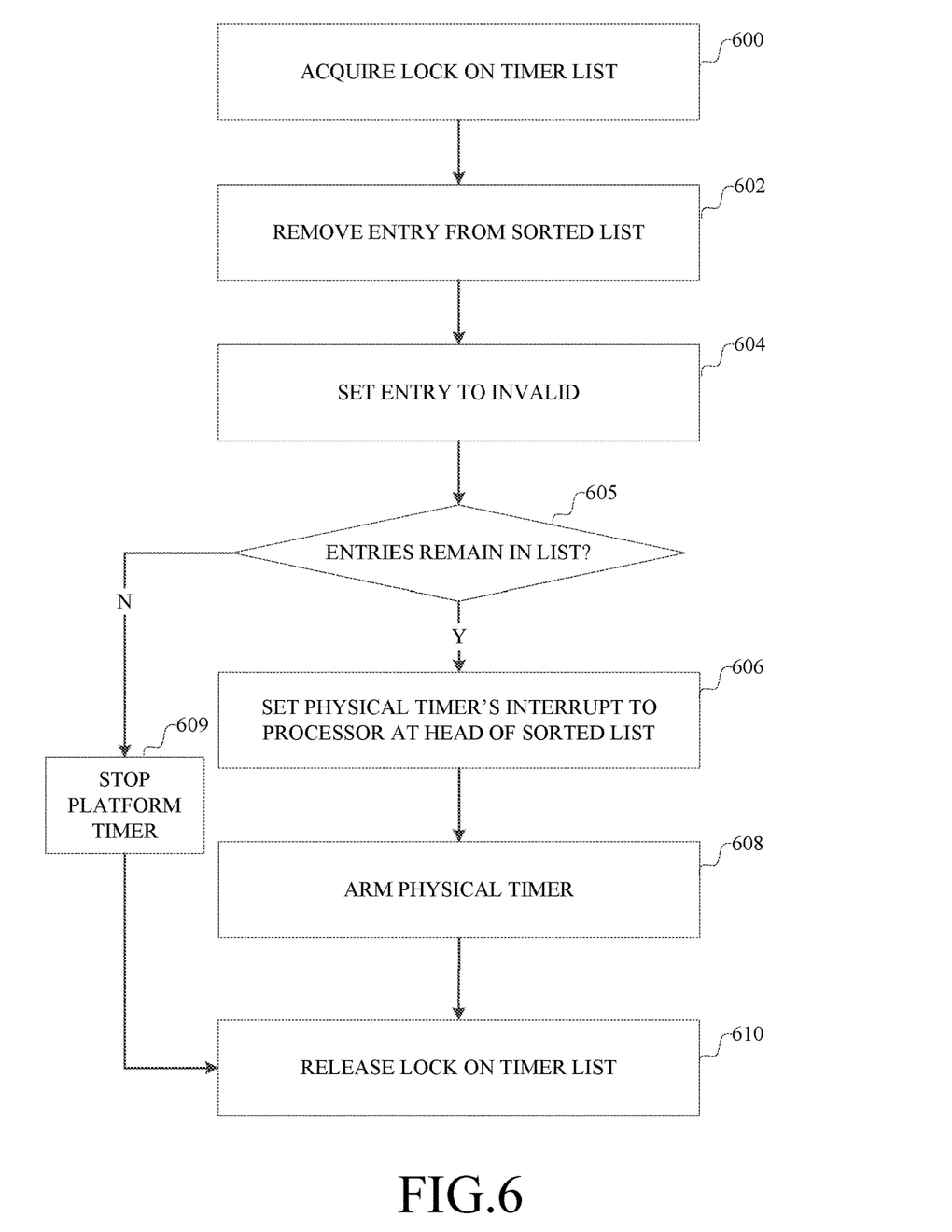
FIG. 6 is a flow chart of an example implementation of stopping a timer.

FIG. 6 describes the process of stopping the virtual per-processor timer for a processor. The processor acquires 600 a lock on the timer list. The entry for this processor is removed 602 from the list of sorted entries for the timer list. The entry for this processor is set 604 to be invalid. If entries remain in the timer list, as determined at 605, then the physical timer is set 606 to direct the interrupt to the processor with the entry at the head of the timer list, and the physical timer is armed (608) for the due time in that entry. If there are no entries in the timer list, as determined at 605, the platform timer is stopped 609 to avoid spurious interrupts from occurring. After stopping or arming the physical timer with the entry at the head of the list, the lock on the timer list is then released 610.

Figure 7:
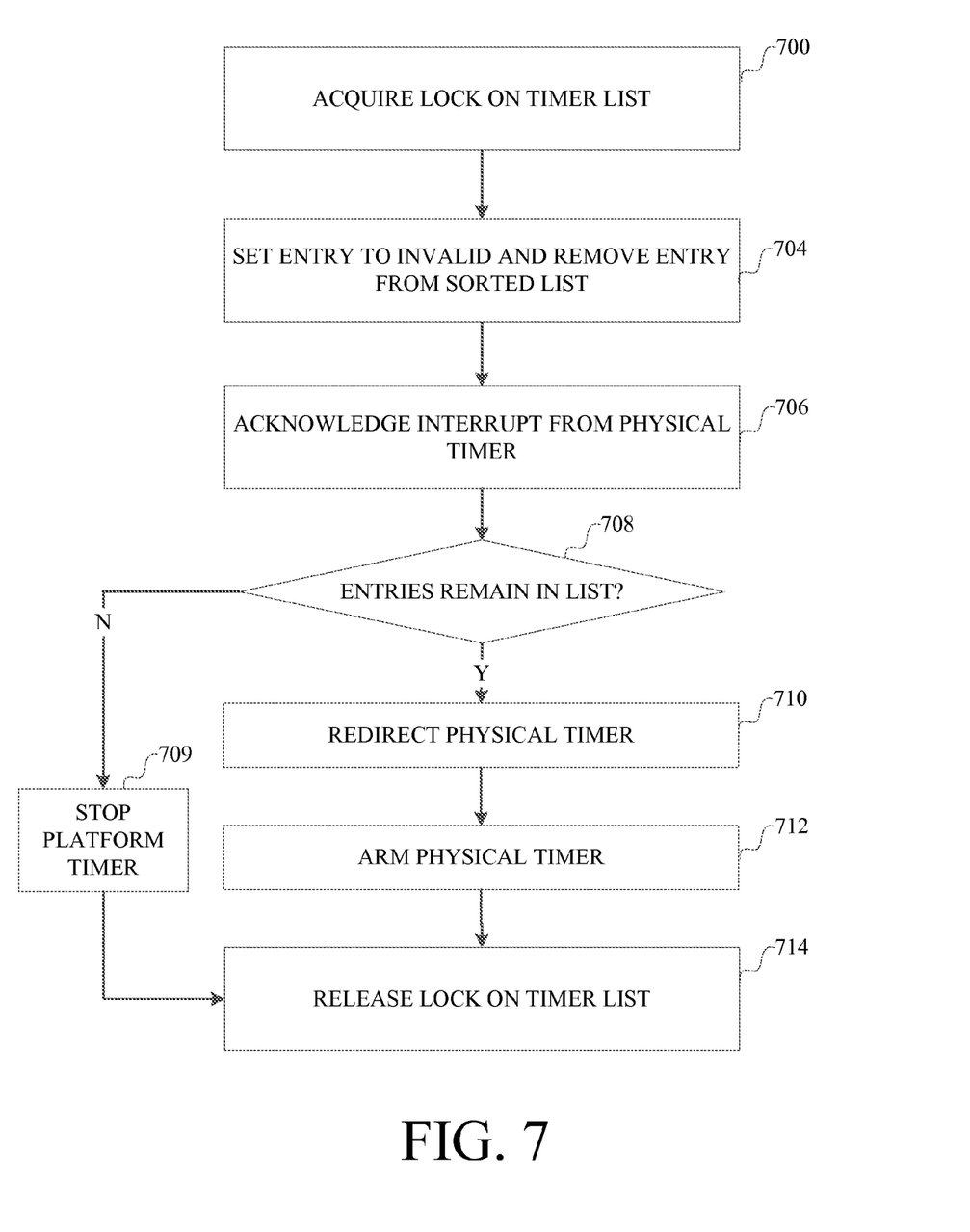
FIG. 7 is a flow chart of an example implementation of acknowledging an interrupt from a timer.

FIG. 7 describes the process of acknowledging an interrupt from the virtual per-processor timer by a processor. The processor acquires 700 the lock on the timer list. The entry for the processor is then set 704 to invalid, and the first entry in the sorted list is removed. The interrupt from the physical timer is then acknowledged 706. If the list of sorted entries in the timer list is not empty, as determined at 708, then the physical timer is redirected 710 to the processor having the entry at the head of the sorted list and the physical timer is armed for the due time of that entry. If there are no entries remaining in the timer list, as determined at 708, the platform timer is stopped 709 to avoid spurious interrupts from occurring. After stopping or arming the platform timer, the lock on the timer list is then released 714.

In addition to variations allowing for multiple timers for each processor, there are several variations of the data structure and processes used to virtualize the platform timer to provide a virtual per-processor timer. In general, the data structure identifies a processor and a due time for each interrupt to be generated. The details of how to manipulate this data structure for arming, stopping and acknowledgement, and other operations, are dependent on implementation.

In addition to the foregoing, the selection of the virtual platform timer to support a virtual per-processor timer can be performed at system startup time. In general, virtualizing a platform timer is dependent on detecting the presence of a platform timer. Given the presence of one or more processors using virtual per-processor timers, entries can be made for these processors in the data structure associated with the platform timer to define the virtual per-processor timers.

The invention also is not limited to virtualizing a platform timer. A per-processor timer can be virtualized by its processor to make multiple virtual per-processor timers.

The invention also is not limited to a system in which per-processor timers are otherwise available. Virtual per-processor timers can be generated in a system that has only platform timers, to allow different processors and higher level software stacks to access a per-processor timer based on a platform timer.

If the platform timer is an always-on timer, and other per-processor timers are not always on, then a virtual per-processor timer based on the platform timer can be used to manage power transitions. In particular, when a processor enters a context-losing idle state, it can transition any per-processor timer to a virtual per-processor timer.

In some implementations, the current time is queried to calculate a value with which to arm the physical timer. Thus, each arming operation can incur overhead associated with querying the current time. To manage the number of queries, the addition of entries to the queue in the timer list can be controlled in a variety of ways. In the implementation noted above, only one entry per processor is maintained in the data structure, and the most recently added entry per processor is kept. It is possible to have multiple entries per processor. Also, the selection between entries, if one or more entries is discarded, can be a function of due time, such as the earliest or latest due time is kept. The particular control strategy used to update the queue can be a system setting.

By having an implementation of virtual per-processor timers, examples of which are described above, multiple processors can manage power transitions independently of each other yet share a platform timer.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer storage media that is not a carrier wave and storing instructions configured to cause a multi-processor computer to perform a process, the multi-processor computing comprising a plurality of processors and a platform timer, each of the plurality of processors having an associated per-processor timer, wherein each of the plurality of processors loses corresponding per-processor timer context during a corresponding power transition, the platform timer generating an interrupt routable to each of the plurality of processors, wherein the platform timer maintains context during the power transition, each of the plurality of processors having a respectively corresponding virtual per-processor timer of a plurality of virtual per-processor timers backed by the platform timer, each processor of the plurality of processors is configured to perform the process, the process comprising:

when a corresponding processor is losing state and the corresponding per-processor timer is armed, arming the corresponding virtual per-processor timer and stop or lose the corresponding per-processor timer, the arming the corresponding virtual per-processor timer comprising:
storing a due time of the corresponding processor;
determining a next entry for the corresponding virtual per-processor timer, the next entry comprising a next due time of the plurality of virtual per-processor timers;

arming the platform timer to generate an interrupt at the next due time associated with the determined next entry with the interrupt directed to the processor corresponding to the determined next entry; and
when handling the platform timer interrupt for a given virtual per-processor timer, determining if there exists an additional entry for the given virtual per-processor timer, the additional entry corresponding to a next due time of all existing virtual per-processor timer due times; and
when the additional entry is determined to exist: arming the platform timer to generate an interrupt at the next due time associated with the additional entry with the interrupt directed to a processor corresponding to the additional entry.

2. The multi-processor computing system of claim 1, further comprising at least a first processor of the plurality of processors configured to:
stop a virtual per-processor timer for the first processor, the stopping the virtual processor timer comprising:
invalidating a first entry for the virtual processor timer, the first entry corresponding to the first processor;
determining if a second entry exists, the second entry being a next due time of the plurality of virtual per-processor timer due times; and
when the second entry exists:
directing the platform timer interrupt to a processor corresponding to the second entry; and
arming the physical timer to fire at the next due time corresponding to the second entry.

3. An article of manufacture comprising:
a computer storage medium;
computer program instructions stored on the computer storage medium which, when processed by a processor in the computer, configure the computer to be comprising:
a platform timer arranged to generate interrupts directed to the plurality of processors, wherein the platform timer maintains context during power transitions
wherein the platform timer is virtualized to define, for each processor of the plurality of processors, a respectively corresponding virtual per-processor timer for the processor by a data structure comprising entries for the processors, wherein each entry corresponds to a processor and includes data specifying a due time for an interrupt to be generated by the platform timer and directed to the processor corresponding to the entry;
wherein each processor of the plurality of processors is configured to, when its per-processor timer is to lose state due to the power transition, specify, independently of the other processors and in its respective entry in the data structure, the respective due time for the interrupt to be generated and directed to the respective processor; and
wherein the computer is configured to set the platform timer using the data structure in the memory by: selecting an entry having a next due time from among the entries, and setting the platform timer with a due time for an interrupt specified by the selected entry and with the interrupt directed to the processor corresponding to the selected entry, and not the other processors.

4. The article of manufacture of claim 3, wherein the entries of the data structure are sorted by due time.

5. The article of manufacture of claim 4, wherein the data structure is a timer list comprising an entry for each processor, wherein an entry is valid if the processor is using the virtual per-processor timer and invalid if the processor is not using the virtual per-processor timer, and a queue of valid entries sorted by due time.

6. The article of manufacture of claim 5, wherein the computer program instructions configure the computer to arm the platform timer by setting the entry for a processor to be valid, and to set the due time of the entry.

7. The article of manufacture of claim 5, wherein the computer program instructions configure the computer to stop the virtual per-processor timer for a given processor, by setting the entry for the processor in the timer list to be invalid, and to re-arm the platform timer if valid entries remain in the timer list.

8. The article of manufacture of claim 5 wherein the computer program instructions configure the computer to acknowledge an interrupt from the platform timer.

9. The article of manufacture of claim 3, wherein the platform timer is configured to maintain context during power transitions, and wherein, when one of the plurality of processors is subject to a context-losing power transition, the processor is configured to use the virtual per-processor timer to provide interrupts to the processor after the power transition.

10. A computer comprising:
   a plurality of processors, each comprising a respective per-processor timer, wherein each per-processor timer loses timer context when the computer's power state changes;
   a platform timer arranged to generate interrupts directed to the plurality of processors, the platform timer retaining timer context when the computer's power state changes;
   a memory arranged to store a data structure comprising entries for the plurality of processors, wherein each entry has a corresponding processor and includes data specifying a due time for an interrupt to be generated by the platform timer and directed to the processor corresponding to the entry;
   wherein each processor of the plurality of processors is configured to specify, independently of the other processors and in a respective entry in the data structure corresponding to the processor, the respective due time for the interrupt to be generated and directed to the respective processor;
   wherein the computer is configured to successively set the platform timer using the data structure in the memory by:
      selecting an entry having a next due time from among the entries in the data structure,
      setting the platform timer with a due time for an interrupt specified by the selected entry with the interrupt directed to the processor corresponding to the selected entry and not the other processors;
   wherein the computer is further configured to, when handling an interrupt for a given processor that generated by the platform timer per the due time in the data structure, determine if there exists an additional entry in the data structure corresponding to a next due time in the data structure for any of the processors; and
   when an additional entry is determined to exist: arm the platform timer to generate an interrupt directed to a processor corresponding to the additional entry.

11. The computer of claim 10, wherein the entries of the data structure are sorted by due time.

12. The computer of claim 11, wherein the data structure is a timer list comprising an entry for each processor, wherein an entry is valid if the processor is using the virtual per-processor timer and invalid if the processor is not using the virtual per-processor timer, and a queue of valid entries sorted by due time.

13. The computer of claim 12, wherein each processor of the plurality of processors is further configured to arm the platform timer by setting the entry for the processor to be valid, and set the due time of the entry.

14. The computer of claim 12, wherein the one of the plurality of processors is further configured to stop the virtual per-processor timer for a given processor, by setting the entry for the processor to be invalid, and to re-arm the platform timer if valid entries remain in the timer list.

15. The computer of claim 12, wherein each processor is further configured to acknowledge an interrupt from the platform timer.

16. The computer of claim 10, wherein the platform timer is configured to maintain context during power transitions, and wherein, when one of the plurality of processors is subject to a context-losing power transition, the processor uses the virtual per-processor timer to provide interrupts to the processor after the power transition.

17. A method performed by a multi-processor computer comprising a plurality of processors and a platform timer, each of the plurality of processors having an associated per-processor timer, wherein each of the plurality of processors loses corresponding per-processor timer context during a corresponding power transition, the platform timer generating an interrupt routable to each of the plurality of processors, wherein the platform timer maintains context during the power transition, each of the plurality of processors having a respectively corresponding virtual per-processor timer of a plurality of virtual per-processor timers backed by the platform timer, each processor of the plurality of processors is configured to perform the method, the method comprising:
   when a corresponding processor is losing state and the corresponding per-processor timer is armed, arming the corresponding virtual per-processor timer and stop or lose the corresponding per-processor timer, the arming the corresponding virtual per-processor timer comprising:
      storing a due time of the corresponding processor;
      determining a next entry for the corresponding virtual per-processor timer, the next entry comprising a next due time of the plurality of virtual per-processor timers;
      arming the platform timer to generate an interrupt at the next due time associated with the determined next entry with the interrupt directed to the processor corresponding to the determined next entry; and
   when handling the platform timer interrupt for a given virtual per-processor timer, determining if there exists an additional entry for the given virtual per-processor timer, the additional entry corresponding to a next due time of all existing virtual per-processor timer due times; and
   when the additional entry is determined to exist: arming the platform timer to generate an interrupt at the next due time associated with the additional entry with the interrupt directed to a processor corresponding to the additional entry.

18. A method according to claim 17, wherein the entries of the data structure are sorted by due time.

19. A method according to claim 17, further comprising arming the platform timer by setting the entry for a processor to be valid, and setting the due time of the entry.

20. A method according to claim 17, further comprising:
stopping the per-processor timer for a given processor by setting the entry for the processor in the data structure to be invalid; and
re-arming the platform timer if valid entries remain in the data structure.

21. A computer storage media that is not a carrier wave and storing instructions configured to cause a multi-processor computer to perform a process, the multi-processor computing comprising a plurality of processors and a platform timer, each of the plurality of processors having an associated per-processor timer, wherein each of the plurality of processors loses corresponding per-processor timer context during a corresponding power transition, the platform timer generating an interrupt routable to each of the plurality of processors, wherein the platform timer maintains context during the power transition, each of the plurality of processors having a respectively corresponding virtual per-processor timer of a plurality of virtual per-processor timers backed by the platform timer, each processor of the plurality of processors is configured to perform the process, the process comprising:
when a corresponding processor is losing state and the corresponding per-processor timer is armed, arming the corresponding virtual per-processor timer and stop or lose the corresponding per-processor timer, the arming the corresponding virtual per-processor timer comprising:
storing a due time of the corresponding processor;
determining a next entry for the corresponding virtual per-processor timer, the next entry comprising a next due time of the plurality of virtual per-processor timers;
arming the platform timer to generate an interrupt at the next due time associated with the determined next entry with the interrupt directed to the processor corresponding to the determined next entry; and
when handling the platform timer interrupt for a given virtual per-processor timer, determining if there exists an additional entry for the given virtual per-processor timer, the additional entry corresponding to a next due time of all existing virtual per-processor timer due times; and
when the additional entry is determined to exist:
arming the platform timer to generate an interrupt at the next due time associated with the additional entry with the interrupt directed to a processor corresponding to the additional entry.

* * * * *